United States Patent
Anderson et al.

(10) Patent No.: US 7,806,956 B2
(45) Date of Patent: Oct. 5, 2010

(54) TUNING PARTICULATE FILTER PERFORMANCE THROUGH SELECTIVE PLUGGING AND USE OF MULTIPLE PARTICULATE FILTERS TO REDUCE EMISSIONS AND IMPROVE THERMAL ROBUSTNESS

(75) Inventors: Matthew L. Anderson, Columbus, IN (US); Thomas M. Yonushonis, Columbus, IN (US); William C. Haberkamp, Cookeville, TN (US); Z. Gerald Liu, Madison, WI (US); Bryan E. Blackwell, Brownsburg, IN (US); Roger D. England, Charleston, SC (US); Matthew P. Henrichsen, Apple Valley, MN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 463 days.

(21) Appl. No.: 11/836,233

(22) Filed: Aug. 9, 2007

(65) Prior Publication Data
US 2009/0038294 A1 Feb. 12, 2009

(51) Int. Cl.
*B01D 24/00* (2006.01)
*B01D 39/06* (2006.01)
*B01D 50/00* (2006.01)
*F01N 3/10* (2006.01)
*F01N 3/08* (2006.01)
*F01N 3/00* (2006.01)
*B01J 23/00* (2006.01)

(52) U.S. Cl. .............................. 55/523; 55/522; 55/524; 422/172; 422/174; 422/175; 422/176; 422/177; 422/178; 422/179; 422/180; 60/297; 502/303

(58) Field of Classification Search ........... 55/522–524; 422/172–180; 60/297; 502/303
See application file for complete search history.

(56) References Cited

U.S. PATENT DOCUMENTS

| | | | | |
|---|---|---|---|---|
| 4,276,071 A | * | 6/1981 | Outland | 55/523 |
| 4,417,908 A | * | 11/1983 | Pitcher, Jr. | 55/523 |
| 4,419,108 A | * | 12/1983 | Frost et al. | 95/286 |
| 4,519,820 A | * | 5/1985 | Oyobe et al. | 55/284 |
| 4,559,193 A | * | 12/1985 | Ogawa et al. | 264/631 |
| 4,568,402 A | * | 2/1986 | Ogawa et al. | 156/89.22 |
| 4,810,554 A | * | 3/1989 | Hattori et al. | 428/116 |
| 4,857,089 A | * | 8/1989 | Kitagawa et al. | 55/523 |
| 4,960,449 A | | 10/1990 | Yonushonis | |
| 4,969,328 A | | 11/1990 | Kammel | |

(Continued)

OTHER PUBLICATIONS

Development of Partial Filter Technology for HDD Retrofit; Todd Jacobs, Sougato Chetterjee, Ray Conway and Andy Walker; Copyright 2005 SAE International.

(Continued)

*Primary Examiner*—Walter D Griffin
*Assistant Examiner*—Amber Orlando
(74) *Attorney, Agent, or Firm*—Andrus, Sceales, Starke & Sawall, LLP (57) ABSTRACT

Modified exhaust aftertreatment filters for filtering engine exhaust are provided as are methods of design and manufacturing modified exhaust aftertreatment filters. The modified filters are subject to reduced back pressure and reduced thermal gradients experienced during regeneration as compared to unmodified filters. The modified filters include flow-through channels obtained by unplugging channels which normally are plugged in an unmodified filter.

48 Claims, 8 Drawing Sheets

U.S. PATENT DOCUMENTS

| | | | | |
|---|---|---|---|---|
| 5,110,561 | A * | 5/1992 | Hitachi et al. | 422/180 |
| 5,171,335 | A * | 12/1992 | Kojima et al. | 55/523 |
| 5,863,311 | A | 1/1999 | Nagai et al. | |
| 6,294,141 | B1 * | 9/2001 | Twigg et al. | 423/213.7 |
| 6,508,852 | B1 * | 1/2003 | Hickman et al. | 55/523 |
| 6,540,816 | B2 | 4/2003 | Allie et al. | |
| 6,544,310 | B2 | 4/2003 | Badeau et al. | |
| 6,656,564 | B2 * | 12/2003 | Ichikawa et al. | 428/116 |
| 6,669,913 | B1 | 12/2003 | Haberkamp | |
| 6,776,814 | B2 | 8/2004 | Badeau | |
| 7,052,532 | B1 | 5/2006 | Liu et al. | |
| 7,056,365 | B2 * | 6/2006 | Ichikawa et al. | 55/523 |
| 7,090,714 | B2 * | 8/2006 | Otsubo et al. | 55/523 |
| 7,211,226 | B2 | 5/2007 | Liu et al. | |
| 7,238,217 | B2 * | 7/2007 | Cutler et al. | 55/523 |
| 7,485,273 | B2 * | 2/2009 | Gandhi et al. | 423/213.2 |
| 7,490,464 | B2 * | 2/2009 | Li et al. | 60/295 |
| 7,578,864 | B2 * | 8/2009 | Watanabe et al. | 55/523 |
| 7,611,560 | B2 * | 11/2009 | Ichikawa | 55/523 |
| 2003/0115859 | A1 * | 6/2003 | Deeba | 60/297 |
| 2003/0223922 | A1 * | 12/2003 | Hsu | 422/180 |
| 2004/0047774 | A1 * | 3/2004 | Suwabe et al. | 422/177 |
| 2004/0161373 | A1 * | 8/2004 | Ichikawa et al. | 422/180 |
| 2004/0258582 | A1 * | 12/2004 | Miwa et al. | 422/177 |
| 2005/0138907 | A1 | 6/2005 | Jobson et al. | |
| 2006/0057046 | A1 * | 3/2006 | Punke et al. | 423/215.5 |
| 2006/0070357 | A1 | 4/2006 | Yonushonis et al. | |
| 2007/0277511 | A1 * | 12/2007 | Suwabe et al. | 60/297 |

OTHER PUBLICATIONS

International Search Report and Written Opinion mailed Aug. 18, 2008.

* cited by examiner

OF OPEN CHANNELS

OF OPEN CHANNELS

0    #OF OPEN CHANNELS

TUNING PARTICULATE FILTER PERFORMANCE THROUGH SELECTIVE PLUGGING AND USE OF MULTIPLE PARTICULATE FILTERS TO REDUCE EMISSIONS AND IMPROVE THERMAL ROBUSTNESS

BACKGROUND

The invention relates to exhaust aftertreatment filters for filtering exhaust from internal combustion engines, including diesel engines.

Exhaust aftertreatment filters for diesel engines are known in the prior art. The filter traps contaminant particulate present in exhaust, and in order to remove the trapped particulate, the filter is heated to burn-off the trapped contaminant particulate as gas. Accordingly, the filter is regenerable and is composed of material on which trapped contaminant particulate from the engine exhaust is removed by addition of heat. Commonly used particulate filter materials include cordierite, silicon carbide, mullite, or aluminum titanate, which are manufactured as filter elements to capture the soot and other particulate generated by the engine.

Diesel particulate filters (DPF) are subject to high temperatures during use. The design of the DPF consists of a honeycomb structure with opposing channels blocked to force exhaust gases to flow through the porous channel walls, while trapping soot. The soot (composed primarily of carbon) accumulates in the DPF and must be removed periodically. Typically, the soot is removed from the filter by oxidation reactions between carbon in the soot and either oxygen (i.e., burning) or nitrogen dioxide, both of which are constituents of the exhaust. The carbon may react with oxygen or nitrogen dioxide according to the following reactions:

$$C_{(s)} + O_{2(g)} \rightarrow CO_{2(g)} \quad (1)$$

$$C_{(s)} + 2NO_2 \rightarrow CO_{2(g)} + 2NO_{(g)} \quad (2)$$

Reaction (1) is the primary reaction that occurs during an active regeneration. Reaction (2) is the primary reaction that occurs during passive regeneration. Heat is a significant by-product of the reaction shown in Reaction (1) and, if not controlled, can cause thermal runaway of the filter, leading to fractures and/or melting of the filter and rendering it ineffective as a filter.

Although thermal runaway may be prevented by controlling the rate at which carbon is burned in the filter, nonetheless the DPF may be subject to thermal gradients caused by differential heating patterns, which also may lead to fractures. Differential heating may occur during active regeneration of the filter where carbon may be unequally distributed, either radially or axially, within the DPF. For example, carbon may be more highly distributed in the DPF at locations where the largest volume of exhaust passes through the filter (i.e., at locations where exhaust velocity is highest). These locations may exhibit a relatively high temperature during active regeneration as compared to other locations.

Although carbon distribution may be altered by modifying the design of a filter, particulate filter manufacturers are hampered by material strength issues that limit the maximum porosity that can be obtained in an extruded honeycomb structure. Filter manufacturers typically design filters that have the lowest back pressure and suitable filtration efficiency as required for a particular engine. However, ceramic filter manufacturers have difficulty designing filters that have the lowest back pressure and suitable filtration efficiency without greatly weakening the honeycomb structures. Furthermore, it is commonly believed that filtration efficiency drops precipitously with even a single unblocked or broken channel in the honeycomb structure of the filter, even though unblocked channels might lower back pressure.

Therefore, there is a need for filters having modified design characteristics in order to minimize back pressure and thermal gradients during regeneration. Furthermore, it is desirable that these modified design characteristics can be combined with control techniques to create filters that are more durable and resistant to structural damage which may occur during use of the filter (e.g., during regeneration).

SUMMARY

Disclosed are exhaust aftertreatment filters and systems for filtering engine exhaust flowing along an axial direction. The filters include a plurality of flow channels comprising a plurality of wall-flow channels and a plurality of flow-through channels. The plurality of wall-flow channels and the plurality of flow-through channels may be positioned in the filter in order to improve back pressure, reduce temperature, and/or increase velocity of exhaust through the filter while maintaining filtering efficiency. Also disclosed are methods of manufacturing filters having modified performance characteristics.

The disclosed filters may be regenerable and composed of monolithic material on which trapped contaminant particulate from the engine exhaust is removed by addition of heat. In some embodiments, the filters are composed of material comprising an axially extending filter element having wall segments extending axially between upstream and downstream ends. The wall segments may define a plurality of axial flow channels including wall-flow channels and flow-through channels. Typically, the wall segments define a first set of first wall-flow channels where the wall segments are alternately sealed to each other by a first set of plugs to define a first set of wall-flow channels closed by the plugs and having open downstream ends; and the wall segments define a set of second wall-flow channels interdigitated with the first set of flow channels and having open upstream ends, the wall segments being alternately sealed to each other by a second set of plugs closing the second set of flow channels. The wall segments further define a third set of flow-through channels positioned in the filter for modifying the performance of the filter (e.g., achieving reduced back pressure, reduced temperature, and/or increased velocity of exhaust) while maintaining adequate filtering efficiency (e.g., efficiency of at least about 95%, 90%, 85%, 80%, 75%, 70%, 60%, or 50% for soot concentrations of about 2.0 gL or less).

The number of flow-through channels may be adjusted to achieve a desired filter performance. In some embodiments, the number of flow-through channels represents at least about 1% of total channels (or at least about 2% of total channels in some embodiments) while the maintained filtering efficiency is at least about 90% (e.g., for soot concentrations of about 2.0 g/L or less). In other embodiments, the number of flow-through channels represents at least about 5% of total channels (or at least about 10% of total channels in some embodiments) while the maintained filtering efficiency is at least about 80% (e.g., for soot concentrations of about 2.0 g/L or less).

The filter may include a coating. For example, the wall segments of the filter may be coated with a coating material, which optionally may include a catalytic agent. In some embodiments of the filters, wall segments defining flow-through channels are coated with a coating material that comprises a catalytic agent. Catalytic agents may include oxidizing catalysts and reducing catalysts. Catalytic agents may include catalysts for at least one reaction selected from the group consisting of $C+O_2 \rightarrow CO_2$ and $2NO+O_2 \rightarrow 2NO_2$. Catalytic agents may include noble metals (e.g., platinum, rhodium, and palladium.)

The wall segments defining the flow-through channels may have an average thickness different than an average thickness of the wall segments defining the first set of wall-flow channels or the wall segments defining the second set of wall-flow channels. In some embodiments of the filters, the wall segments defining the flow-through channels have an average thickness greater than an average thickness of the wall segments defining the first set of wall-flow channels or the wall segments defining the second set of wall-flow channels.

The flow-through channels may be distributed in the filter in any suitable arrangement. In some embodiments, the flow-through channels are distributed in the filter in a gradient, where the filter has an increasing concentration of open channels in sections located at peripheral positions in the filter as compared to sections located at central positions of the filter.

The filter may include wall segments further defining a fourth set of channels having closed downstream ends and closed upstream ends (i.e., closed channels). The closed channels may be positioned in the filter in order to reduce physical damage to the periphery of the filter. In some embodiments of the filters, the closed channels form a peripheral ring in the filter. Optionally, the wall segments defining the closed channels have an average thickness greater than an average thickness of the wall segments defining the first set of wall-flow channels or the wall segments defining the second set of wall-flow channels. In further embodiments, the flow-through channels may be arranged in a ring adjacent to a peripheral ring formed by the closed channels.

The filter may be composed of any suitable material. In some embodiments, the filter is composed of a ceramic material, examples of which are cordierite, silicon carbide, mullite, and aluminum titanate. The filter may be monolithic (i.e., composed of single piece of material), or segmented (i.e., composed of multiple pieces of material bonded together).

The filters may be utilized alone or may be combined with additional components in an exhaust aftertreatment system for filtering engine exhaust flowing along an axial direction. For example, an exhaust aftertreatment system as disclosed herein may include the following components in series along an axial direction: a diesel oxidation catalyst, a first filter as disclosed herein, and optionally a second filter.

The disclosed exhaust aftertreatment systems for filtering engine exhaust flowing along an axial direction may comprise at least a first filter and a second filter arranged in series along the axial direction, where the first filter is positioned upstream of the second filter and has a lower filtration efficiency than the second filter. The first and second filter may be composed of a monolithic ceramic material such as cordierite, silicon carbide, mullite, and aluminum titanate (optionally having a honeycomb or ceramic bead structure). The first filter, second filter, or both filters may include a coating material that comprises a catalytic agent (e.g., an oxidizing catalyst for converting nitric oxide to nitrogen dioxide). Typically, at least one of the first and second filters includes a plurality of wall-flow channels and flow-through channels. Optionally, at least one of the first and second filters includes closed channels. The flow-through channels and closed channels, if present, may be arranged in any suitable formation, including a formation where a peripheral ring of closed channels surrounds an adjacent ring of flow-through channels.

In the disclosed systems, the first filter may be composed of a first regenerable material and the second filter may be composed of a second regenerable material that is different than the first regenerable material. For example, the first regenerable material may have a larger pore diameter than the second regenerable material. In some embodiments, the first filter is a high cell density flow-through element having a cell density of greater than 200 per square inch. In other embodiments, the first filter may be a partially plugged filter. In further embodiments, the second filter may have a high cell density (e.g., a cell density of greater than 200 per square inch), which may be higher than the first filter.

In the disclosed systems, the first filter may have a soot filtration efficiency that is lower than the second filter. In some embodiments, the first filter has a soot filtration efficiency of at least about 50% (e.g., about 50-60% in some embodiments) and the second filter has a soot filtration efficiency of at least about 90% (or at least about 95% in some embodiments).

The disclosed systems optionally include a catalytic converter element, such as a diesel oxidation catalyst element, which may be arranged in series with the first filter and the second filter along the axial direction. The catalytic converter element may be positioned upstream of the first filter and may include an oxidizing catalyst for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$ (where in some embodiments x is an integer from 1-25 and y is an integer from 0-52). In some embodiments, the first filter may include an oxidizing catalyst for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$ (where in some embodiments x is an integer from 1-25 and y is an integer from 0-52). Optionally, the second filter may include an oxidizing catalyst for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$ (where in some embodiments x is an integer from 1-25 and y is an integer from 0-52).

Also disclosed are methods for manufacturing a modified exhaust aftertreatment filter for filtering engine exhaust flowing along an axial direction and having modified performance. The modified filter has a structure as described herein.

In some embodiments of the methods of manufacture, an unmodified filter is composed of regenerable material comprising an axially extending filter element having wall segments extending axially between upstream and downstream ends. The wall segments may define a plurality of axial flow channels including wall-flow channels and flow-through channels. Typically, the wall segments define a first set of first wall-flow channels where the wall segments are alternately sealed to each other by a first set of plugs to define a first set of wall-flow channels closed by the plugs and having open downstream ends; and the wall segments define a set of second wall-flow channels interdigitated with the first set of flow channels and having open upstream ends, the wall segments being alternately sealed to each other by a second set of plugs closing the second set of flow channels.

The methods of manufacture typically include selecting and removing at least one plug of the first set of plugs and the second set of plugs to provide open flow in at least one channel of the modified filter. In some embodiments, the selected plug for removal is located at a position in the unmodified filter whereby removing the plug reduces back pressure on the modified filter during operation while maintaining filtering efficiency. In other embodiments, the selected plug for removal is located at a position in the unmodified filter which is subject to relatively high temperature during operation of the unmodified filter as compared to a non-selected plug, thereby reducing the relatively high temperature during operation of the modified filter while maintaining filtering efficiency. In further embodiments, the selected plug for removal is located at a position in the unmodified filter where exhaust flow exhibits relatively low velocity during operation of the unmodified filter as compared to a position of a non-selected plug, thereby increasing the relatively low velocity during operation of the modified filter while maintaining filtering efficiency.

Also disclosed are exhaust aftertreatment filters for filtering engine exhaust prepared by the disclosed methods of manufacture. In some embodiments, the filters prepared by the methods of manufacture include a number of flow-through channels representing at least about 1% of total channels (or at least about 2% of total channels in some embodiments) while the maintained filtering efficiency of the modified filter is at least about 90% (or at least about 80% in some embodiments) (e.g., for soot concentrations of about 2.0 g/L or less).

BRIEF DESCRIPTION OF THE DRAWINGS

FIG. 4b illustrates a potential distribution of open channels in a filter designed to increase flow at locations of relatively low exhaust velocity in view of the parabolic flow profile of FIG. 4a.

FIG. 5b illustrates a potential distribution of open channels in a filter designed to increase flow at locations of relatively low exhaust velocity in view of the turning flow profile of FIG. 5a.

FIG. 6b illustrates a potential distribution of open channels in a filter designed to increase flow at locations of relatively low exhaust velocity in view of the flat flow profile of FIG. 6a.

DETAILED DESCRIPTION

Figure 1:
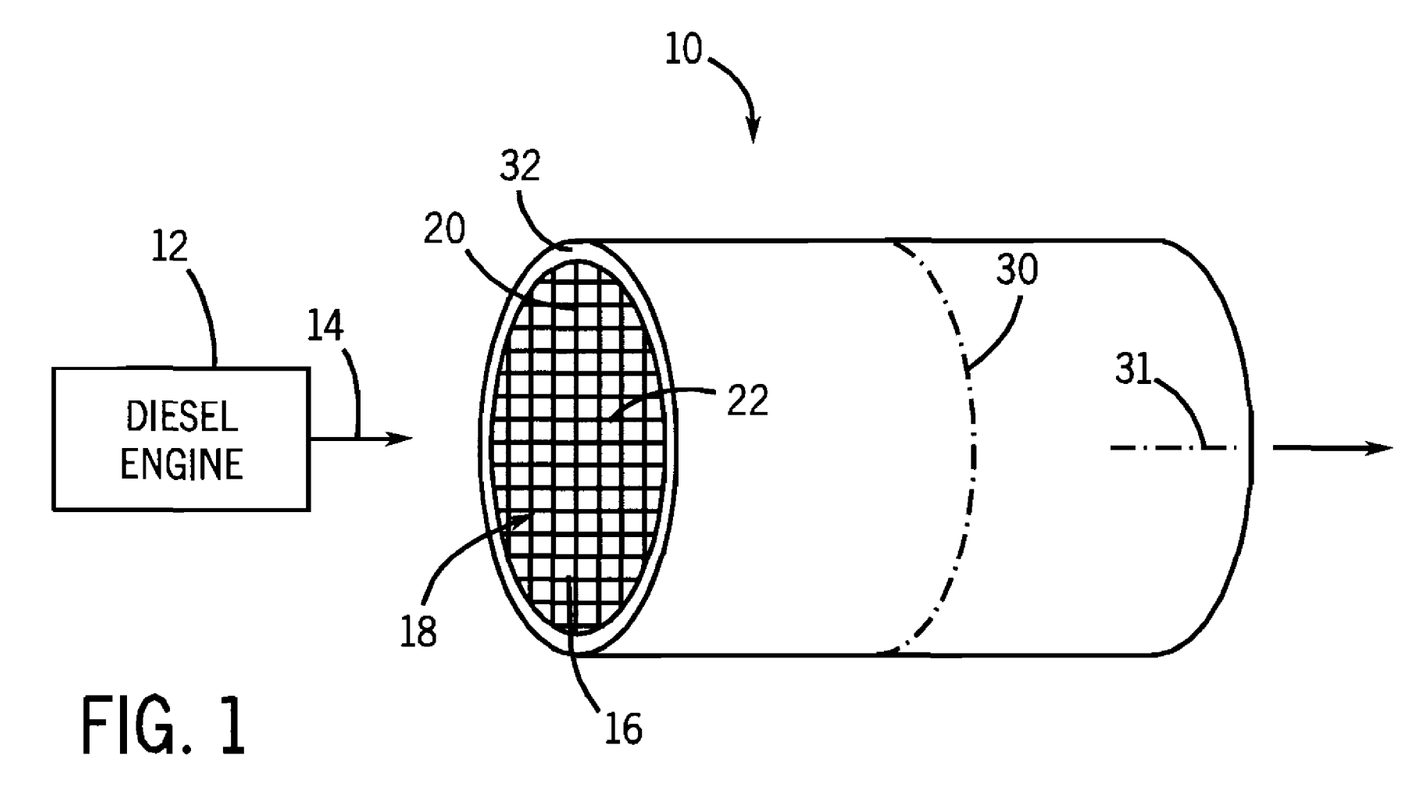
FIG. 1 is a perspective view of an exhaust aftertreatment filter.
Figure 2:
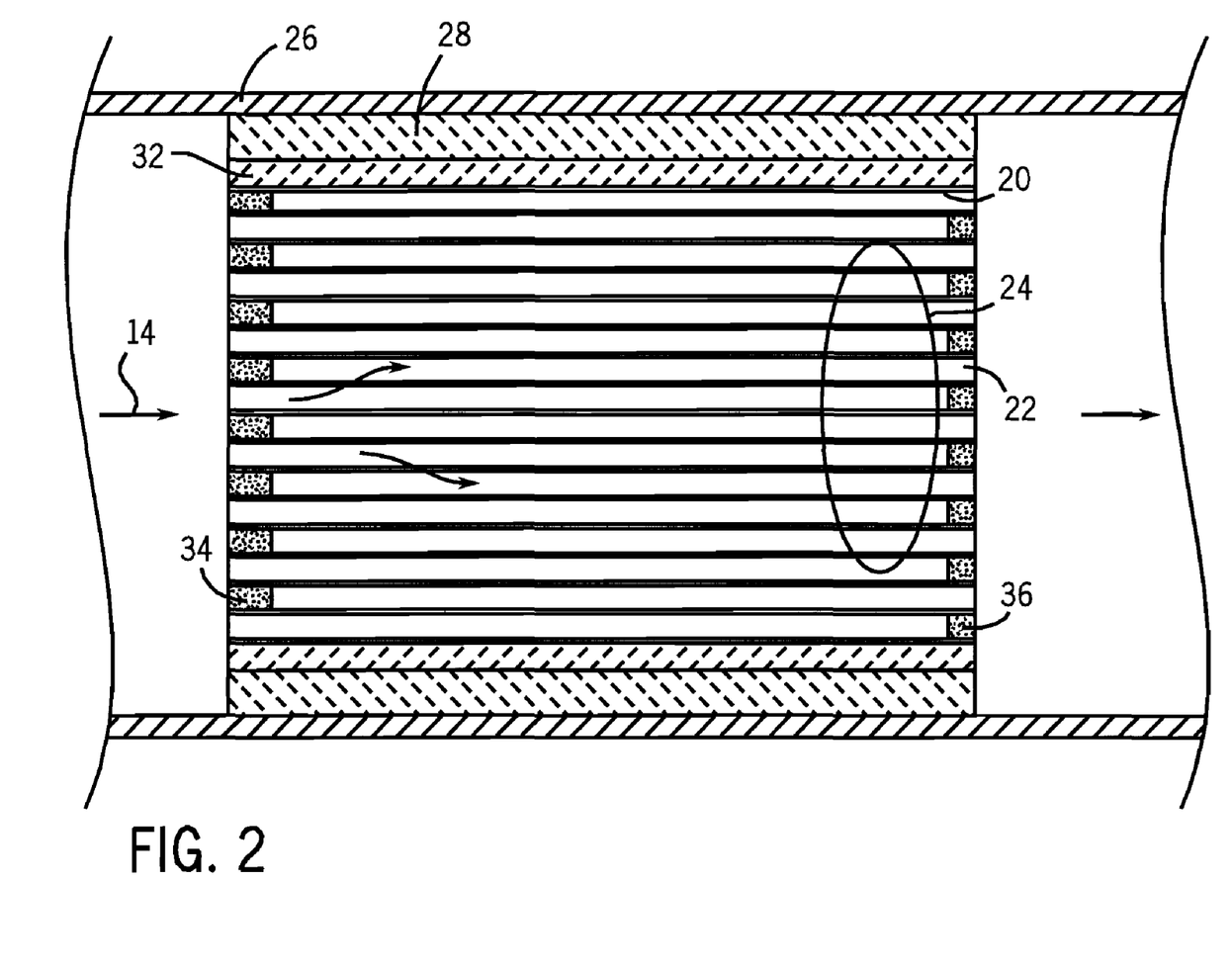
FIG. 2 is a sectional view of the exhaust aftertreatment filter of FIG. 1.

FIG. 1 shows an exhaust aftertreatment filter 10 for filtering exhaust from an internal combustion engine, such as diesel engine 12, flowing along an axial flow direction 14. FIG. 2 shows a section view of the filter of FIG. 1. The filter is composed of particulate filtration material 16, as known in the prior art, for example ceramic such as a cordierite, silicon carbide, mullite, or aluminum titanate on which trapped contaminant particulate from the engine exhaust is removed by addition of heat. The filter 10 includes wall-flow channels formed by wall segments having an upstream plug 34 or a downstream plug 36. Contaminant particulate such as soot is trapped and accumulates in the filter, which trapped contaminant particulate is burned-off during regeneration. The filter includes a filter body 18 having an outer periphery 20 surrounding a central core 22. Outer periphery 20 and central core 22 may be subject to differential thermal expansion during thermal cycling during regeneration, due to outer periphery 20 being cooler than central core 22. For example, FIG. 2 shows central hot spot 24, which is hotter than outer periphery 20, and which may be more dominant at the downstream side of the filter where particulate contaminant may accumulate and clog. With or without clogging or a downstream hot spot such as 24, outer periphery 20 may run cooler than central core 22, as is known. The filter is typically mounted in a housing 26, such as a stainless steel canister, having a mat mounting material 28 surrounding the filter body and performing a number of functions including thermal resistance, dampening of vibration, and resistance to movement. The mat material is typically compressed between housing 26 and filter body 18.

The noted differential thermal expansion between hotter central core 22 and cooler outer periphery 20 may subject the filter body to separational axial tensile stress in the axial direction which in turn subjects the filter body to separational fracture and cracking, for example as shown at fracture or crack line 30 in FIG. 1. It is known by catalyst and filter manufacturers that the radial compressive stress applied by pressure obtained from an expanding mat material 28 assists in reducing the fracture probability of filter body 18. However, the radial compressive stress reduces the probability of fracture along a fracture line parallel to axis 31 of the filter perpendicular to crack line 30), and does little to prevent fractures along a fracture or crack line such as 30. Furthermore, the mat material can degrade over time, resulting in loss of pressure. With larger and heavier filters and longer lifetimes, particularly for diesel particulate filters in wall-flow application versus automotive flow-through catalyst application, the noted pressure and compressive stress applied by mat material 28 will decrease more rapidly, particularly than that observed for automotive catalysts. Furthermore, an automotive catalyst can still function after cracking because of its flow-through application, whereas a contaminant particulate filter loses effectiveness if cracked because of the bypass flow path created. The filter may include a pre-stressed layer 32 bonded to filter body 18 at outer periphery 20 and is compressively axially pre-stressed in the opposite axial direction to the noted separational axial tensile stress to counteract the latter during regenerative heating.

Figure 3A:
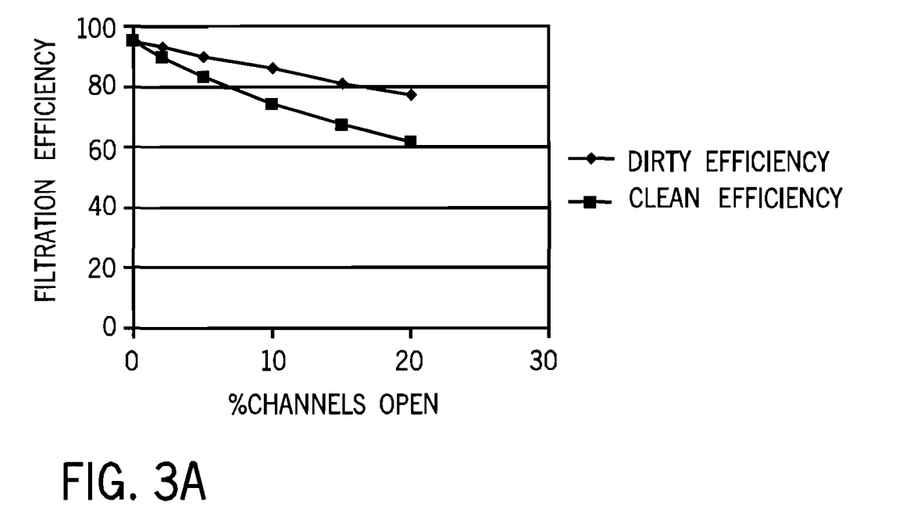
FIG. 3 illustrates the effects on filtering efficiency (top) and filter restriction (bottom) versus percentage channels open (i.e., percentage flow-through channels) in a modified filter having a 12 inch diameter by 12 inch length with 200 cells per square inch.
Figure 3B:
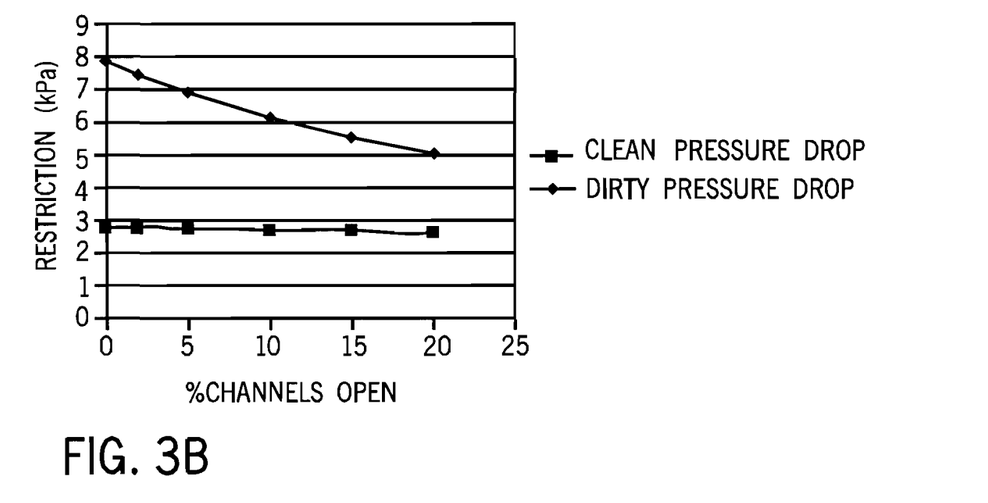

The modified exhaust aftertreatment filters disclosed herein include a plurality of flow-through channels obtained by removing an upstream plug 34 or downstream plug 36 in what otherwise would be a wall-flow channel in an unmodified filter. The selected flow-through channels may be located at any suitable position in the modified filter and may be patterned in the filter in order to modify the performance of the filter. In some embodiments, open-flow channels may be provided at locations that are normally are subject to relatively low exhaust gas flow (e.g., locations at the outer diameter of the filter), which may result in a decreased pressure drop. The modified filters may include a percentage of open-flow channels relative to total channels that does not significantly impair filtering efficiency as illustrated in FIG. 3.

Figure 4A:
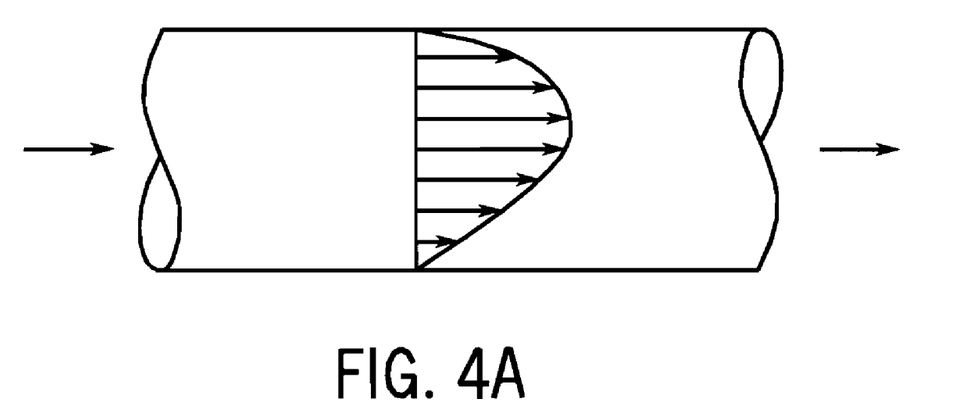
FIG. 4a illustrates the velocity of exhaust through a filter exhibiting a parabolic flow profile.
Figure 4B:
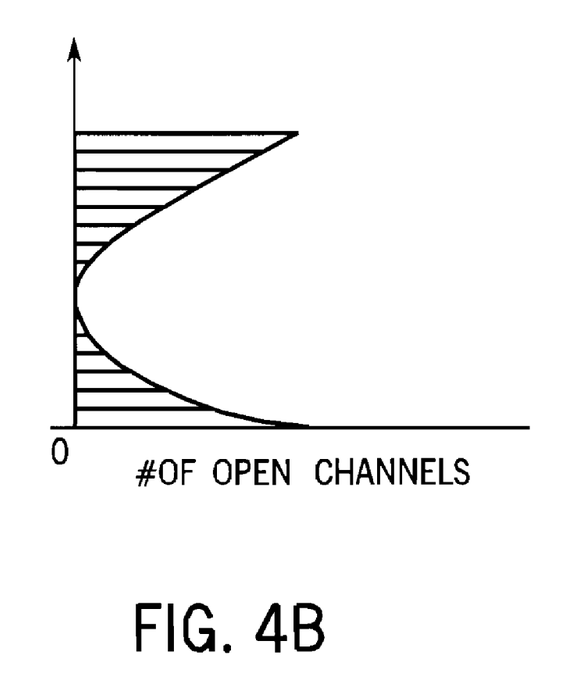
Figure 5A:
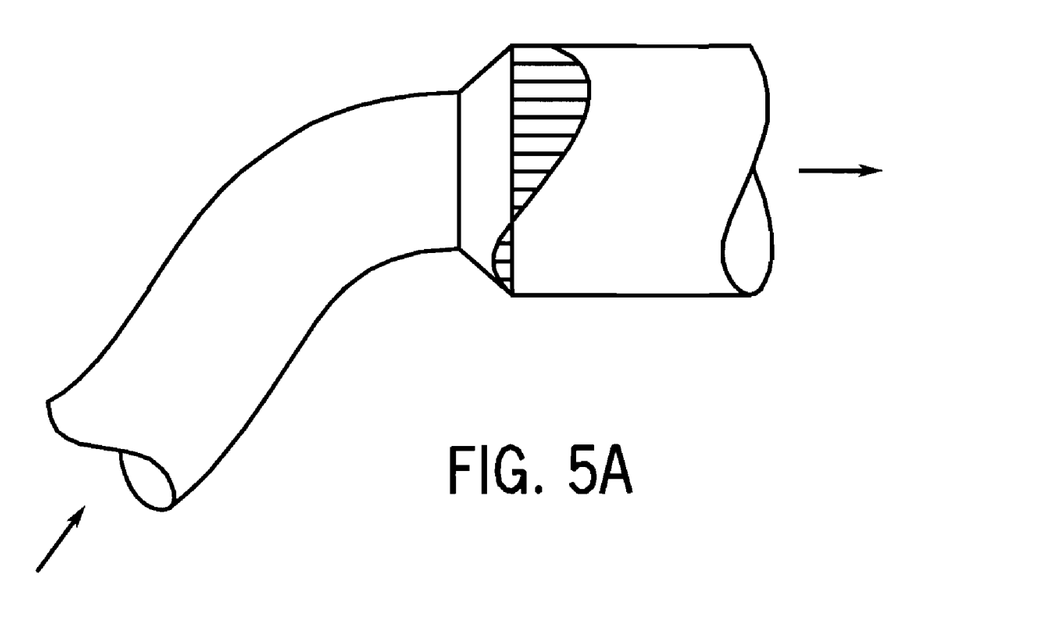
FIG. 5a illustrates the velocity of exhaust through a filter exhibiting a turning flow profile.
Figure 5B:
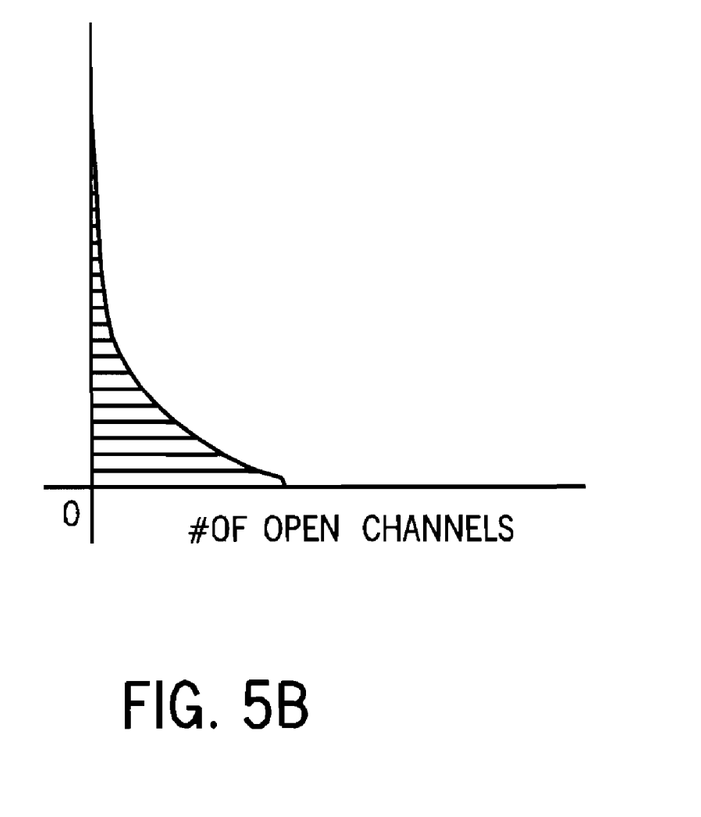
Figure 6A:
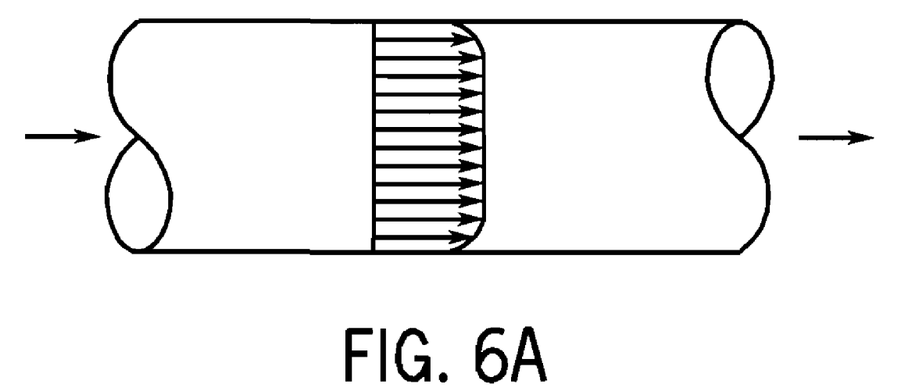
FIG. 6a illustrates the velocity of exhaust through a filter exhibiting a flat velocity profile.
Figure 6B:
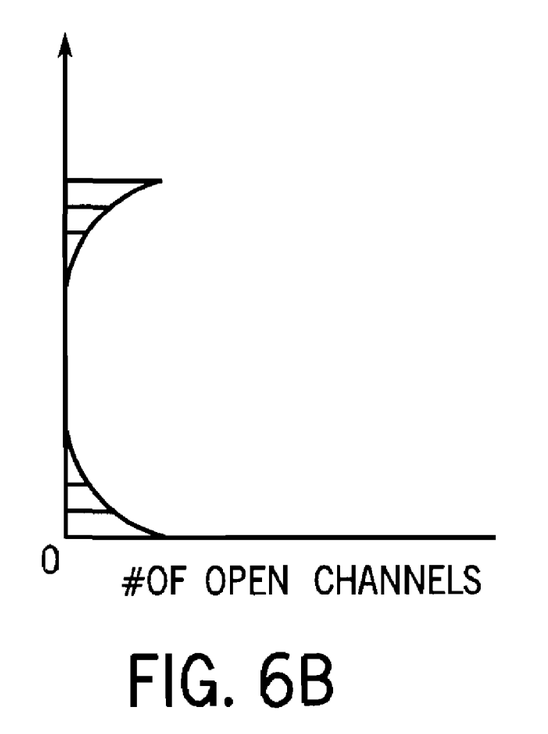

For a filter subject to low speed laminar flow with a parabolic exhaust velocity distribution, channels may be opened in such a pattern that the number of the open channels is inversely related to the pipe velocity as shown in FIG. 4, and according to the equation N=k1/(Velocity Profile), where N is the number of open channels within a selected area of the filter and k1 is a coefficient which can be tuned to optimize the flow distribution. If a filter is located right after a fitting due to space constrain (such as an elbow or an expansion tube) and the fitting causes sudden changes of flow pathlines, channels may be opened against the velocity profile as shown in FIG. 5. For fully developed turbulent flows as shown in FIG. 6, the following equation may be used to determine a suitable number of open channels for a given area of the filter: N=k2/(Velocity Profile)$^{1/n}$, where N is the number of open channels within a selected area of the filter; k2 is a coefficient which can be tuned to optimize the flow distribution; and 1<n<2.

Figure 7:
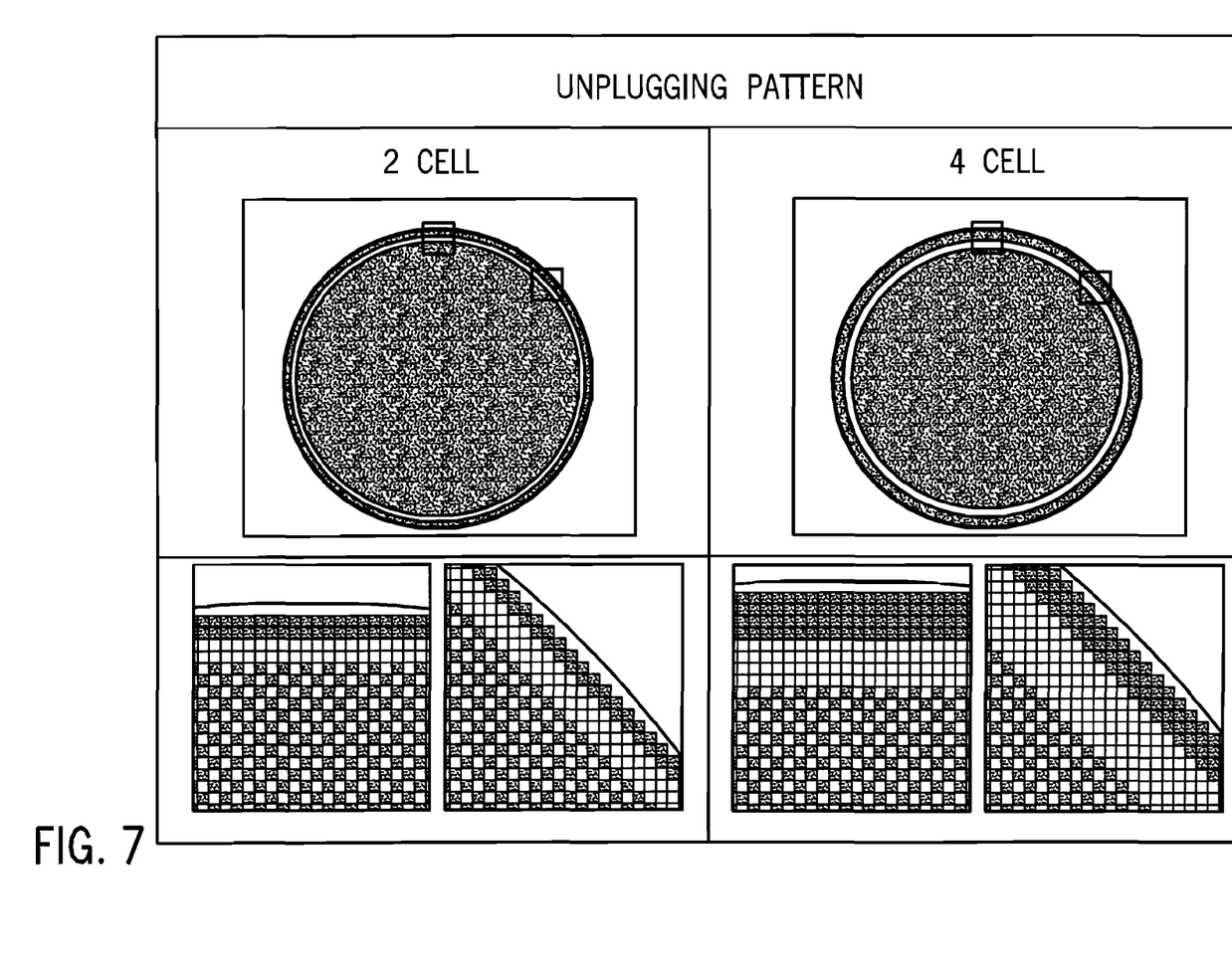
FIG. 7 illustrates two filters having sample unplugging patterns (i.e., modified filters). The sample patterns include a 2-cell (or 4-cell) peripheral ring of double-plugged channels adjacent to a 2-cell (or 4-cell) ring of flow-through channels.

The modified filters typically include open-flow channels (i.e., unplugged channels). Optionally, the modified filters may include double-plugged channels (i.e., channels having both an upstream plug 34 and a downstream plug 36, as compared to a single-plug channel having only an upstream plug 34 or a downstream plug 36 and defining a wall-flow channel). The unplugged channels and double-plugged channels may be arranged in any suitable formation. FIG. 7 illustrates an arrangement in filter having a peripheral ring of double-plugged channels (either 2-cells or 4-cells wide) adjacent to a ring of unplugged channels (either 2-cells or 4-cells wide). For both double-plugged and unplugged cells (optionally in a ring formation), the wall thickness may be higher than single-plugged cells. A filter having double-plugged or unplugged cells with thicker walls may be more robust to handling, regeneration thermal shock, or ringoff failures. In some embodiments of the filters, double-plugged and unplugged cells may have lesser wall porosity relative to single-plugged cells.

A variety of distributions of plugs in the filters could be used to change gas flow, particularly in combination with a series filtration approach. For example, the disclosed filters may be used in a modified diesel particulate filter design to lower engine back pressure and improve soot distribution. In some embodiments, the design includes two filter elements, where the first filter element may have lower filtration efficiency than the second filter element.

By modifying the element architecture, it may be possible to improve the soot distribution on the filter, reduce thermal gradients during an active regeneration, and increase the level of passive regeneration. In a modified diesel particulate filter design, the filter element may be broken into two or more elements with progressively increasing filtration efficiency. Commonly, DPFs have about 90% filtration efficiency. In a modified diesel particulate filter design, the filter may be separated into two separate filter elements. For example, the first filter may have a filtering efficiency on the order of 50-60%, while the second filter may have a filtration efficiency of about 90%. The reduction in filtration efficiency for the first filter may be attained by several methods. One method may be to reduce the percentage of plugged channels, either randomly, or in a specific pattern in the first filter. A second method may be to increase the pore diameter of the filter material of the first filter, thus allowing more soot particles to pass through the walls. A third method may be to use a high cell density flow-through element for the first filter (e.g., an element having a cell density greater than about 200 cells per square inch).

Potential methods for decreasing filtration efficiency for the first filter element could be to use a high cell density flow-through element, higher pore size filters, or selective plugging of channels (partially plugged filter). The use of a partially plugged filter may be used to affect the flow distribution and temperature distribution within a modified diesel particulate filter design.

Figure 8:
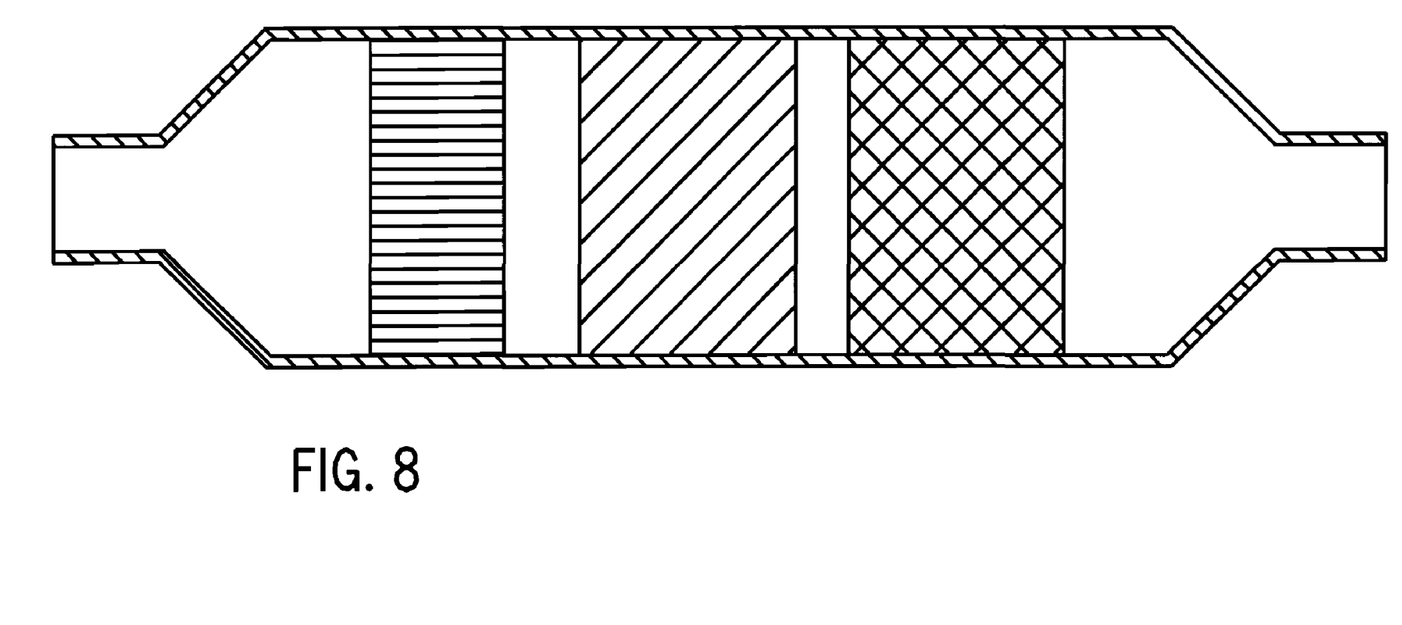
FIG. 8 illustrates an exhaust aftertreatment system including a diesel oxidation catalyst (DOC) in series with a first filter element and a second filter element.

A filtration system, as shown in FIG. 8, incorporates a DOC to heat the exhaust gases to burn the accumulated soot in the filters. The first filter may also incorporate a catalyst to burn hydrocarbons not burned in the DOC and to oxidize NO (nitric oxide). Optionally, the second filter may incorporate a catalyst.

Catalysts, as described herein, may include oxidation catalysts and reduction catalysts. Catalysts may include $NO_x$ adsorbers (e.g., where x is 1 or 2). In some embodiments, the combustion product of diesel particulate matter is a soot oxidation product, e.g., CO, and the noted downstream $NO_x$ adsorber is regenerated with the assistance of CO derived from the oxidation of the diesel particulate matter. The downstream $NO_x$ adsorber is provided in sufficiently close proximity to the diesel particulate filter to maximize the probability that the CO will assist in regeneration of the $NO_x$ adsorber. Preferably, the CO assists $NO_x$ adsorber regeneration by releasing stored $NO_x$, for example according to the reaction $Ba(NO_3)_2 + 3CO \rightarrow BaCO_3 + 2NO + 2CO_2$. Furthermore, the CO preferably assists in regeneration of the $NO_x$ adsorber by reducing the released $NO_x$ to benign $N_2$, for example according to the reaction $NO + CO \rightarrow 1/2 N_2 + CO_2$. Furthermore, the CO preferably assists in regeneration of the $NO_x$ adsorber by oxidizing CO (either through one of the above two reactions, or by reaction with $O_2$ over the noble metal component of the $NO_x$ adsorber according to $CO + 1/2 O_2 \rightarrow CO_2$) with substantial heat release. Close proximity of the particulate filter to the $NO_x$ adsorber allows efficient utilization of this heat to assist regeneration of the filters and systems disclosed herein.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible within the scope of the appended claims.

What is claimed is:

1. An exhaust aftertreatment filter for filtering engine exhaust flowing along an axial direction, said filter being composed of monolithic regenerable material and comprising an axially extending filter element having wall segments extending axially between upstream and downstream ends, said wall segments defining axial flow channels therebetween, said wall segments being alternately sealed to each other by a first set of plugs to define a first set of flow channels closed by said plugs and having open downstream ends, and a second set of flow channels interdigitated with said first set of flow channels and having open upstream ends, said wall segments being alternately sealed to each other by a second set of plugs closing said second set of flow channels, said wall segments further defining a third set of channels having open flow, said third set of channels having selected positions in said filter for reducing back pressure on said filter during operation while maintaining filtering efficiency, said wall segments further defining a fourth set of flow channels having closed downstream ends and closed upstream ends, said fourth set of flow channels forming a peripheral ring in said filter, wherein said third set of flow channels are arranged in a ring adjacent to the peripheral ring formed by the fourth set of flow channels.

2. The filter of claim 1, wherein said channels of said third set represent at least about 1% of total channels in said filter and said maintained filtering efficiency is at least about 75%.

3. The filter of claim 1, further comprising a coating material along at least some of said wall segments defining said third set of flow channels.

4. The filter of claim 3, wherein said coating material comprises a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

5. The filter of claim 1, wherein said wall segments defining said third set of flow channels have an average thickness greater than an average thickness of said wall segments defining said first set of flow channels or said wall segments defining said second set of flow channels.

6. The filter of claim 1, wherein said wall segments further defining said fourth set of flow channels have an average thickness greater than an average thickness of said wall segments defining said first set of flow channels or said wall segments defining said second set of flow channels.

7. The filter of claim 1, wherein said filter is composed of a ceramic material selected from the group consisting of cordierite, silicon carbide, mullite, and aluminum titanate.

8. An exhaust aftertreatment system for filtering engine exhaust flowing along an axial direction, said system comprising at least a first and a second filter arranged in series along said axial direction, said first filter being positioned upstream of said second filter and having a lower filtration efficiency than said second filter, wherein at least one of said first and second filter is composed of monolithic regenerable filtration material, said material comprising an axially extending filter element having wall segments extending axially between upstream and downstream ends, said wall segments defining axial flow channels therebetween, said wall segments being alternately sealed to each other by a first set of plugs to define a first set of flow channels closed by said plugs and having open downstream ends, and a second set of flow channels interdigitated with said first set of flow channels and having open upstream ends, said wall segments being alternately sealed to each other by a second set of plugs closing said second set of flow channels, and said wall segments further defining a third set of channels having open flow, said wall segments further defining a fourth set of flow channels having closed downstream ends and closed upstream ends, said fourth set of flow channels forming a peripheral ring in said filter, wherein said third set of flow channels are arranged in a ring adjacent to the peripheral ring formed by the fourth set of flow channels.

9. The system of claim 8, wherein said first filter is composed of said filtration material.

10. The system of claim 8, wherein said second filter is composed of said filtration material.

11. The system of claim 8, wherein said first filter and said second filter are composed of said filtration material.

12. The system of claim 8, wherein said first filter and said second filter are composed of a ceramic material selected from cordierite, silicon carbide, mullite, and aluminum titanate.

13. The system of claim 8, wherein said wall segments further defining at least one of said first, second, or third set of flow channels comprise a coating material.

14. The system of claim 13, wherein said coating material comprises a catalytic agent for a reaction wherein nitric oxide is oxidized to nitrogen dioxide.

15. The system of claim 8, wherein the wall segments defining said third set of flow channels have an average thickness greater than an average thickness of said wall segments defining said first set of flow channels or said wall segments defining said second set of flow channels.

16. The system of claim 8, wherein said first filter is composed of a first filtration material and said second filter is composed of a second filtration material that is different than said first filtration material.

17. The system of claim 16, wherein said first filtration material has a larger pore diameter than said second filtration material.

18. The system of claim 8, wherein said first filter has a cell density of greater than 300 per square inch and comprises flow through channels.

19. The system of claim 8, wherein said second filter has a cell density of greater than 200 per square inch.

20. The system of claim 8, wherein said first filter has a soot filtration efficiency of at least about 50% and said second filter has a soot filtration efficiency of at least about 90%.

21. The system of claim 20, wherein said first filter has a soot filtration efficiency of about 50-60%.

22. The system of claim 8, further comprising a diesel oxidation catalyst element arranged in series with said first filter and said second filter along said axial direction, said diesel oxidation catalyst element being positioned upstream of said first filter and comprising a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

23. The system of claim 22, wherein said first filter comprises a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

24. The system of claim 22, wherein said second filter comprises a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

25. An exhaust aftertreatment filter for filtering engine exhaust flowing along an axial direction, said filter being composed of monolithic regenerable material and comprising an axially extending filter element having wall segments extending axially between upstream and downstream ends, said wall segments defining axial flow channels therebetween, said wall segments being alternately sealed to each other by a first set of plugs to define a first set of flow channels closed by said plugs and having open downstream ends, and a second set of flow channels interdigitated with said first set of flow channels and having open upstream ends, said wall segments being alternately sealed to each other by a second set of plugs closing said second set of flow channels, said wall segments further defining a third set of channels having open flow, said third set of channels having selected positions in said filter for reducing back pressure on said filter during operation while maintaining filtering efficiency, said wall segments further defining a fourth set of flow channels having closed downstream ends and closed upstream ends, said fourth set of flow channels forming a peripheral ring in said filter, wherein said third set of flow channels are distributed in said filter in a gradient, said filter having an increasing concentration of open channels in sections located at peripheral positions in said filter as compared to sections located at central positions of said filter.

26. The filter of claim 25, wherein said channels of said third set represent at least about 1% of total channels in said filter and said maintained filtering efficiency is at least about 75%.

27. The filter of claim 25, further comprising a coating material along at least some of said wall segments defining said third set of flow channels.

28. The filter of claim 27, wherein said coating material comprises a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

29. The filter of claim 25, wherein said wall segments defining said third set of flow channels have an average thickness greater than an average thickness of said wall segments defining said first set of flow channels or said wall segments defining said second set of flow channels.

30. The filter of claim 25, wherein said wall segments further defining said fourth set of flow channels have an average thickness greater than an average thickness of said wall segments defining said first set of flow channels or said wall segments defining said second set of flow channels.

31. The filter of claim 25, wherein said filter is composed of a ceramic material selected from the group consisting of cordierite, silicon carbide, mullite, and aluminum titanate.

32. An exhaust aftertreatment system for filtering engine exhaust flowing along an axial direction, said system comprising at least a first and a second filter arranged in series along said axial direction, said first filter being positioned upstream of said second filter and having a lower filtration efficiency than said second filter, wherein at least one of said first and second filter is composed of monolithic regenerable filtration material, said material comprising an axially extending filter element having wall segments extending axially between upstream and downstream ends, said wall segments defining axial flow channels therebetween, said wall segments being alternately sealed to each other by a first set of plugs to define a first set of flow channels closed by said plugs and having open downstream ends, and a second set of flow channels interdigitated with said first set of flow channels and having open upstream ends, said wall segments being alternately sealed to each other by a second set of plugs closing said second set of flow channels, and said wall segments further defining a third set of channels having open flow, said wall segments further defining a fourth set of flow channels having closed downstream ends and closed upstream ends, said fourth set of flow channels forming a peripheral ring in said filter, wherein said third set of flow channels are distributed in said filter in a gradient, said filter having an increasing concentration of open channels in sections located at peripheral positions in said filter as compared to sections located at central positions of said filter.

33. The system of claim 32, wherein said first filter is composed of said filtration material.

34. The system of claim 32, wherein said second filter is composed of said filtration material.

35. The system of claim 32, wherein said first filter and said second filter are composed of said filtration material.

36. The system of claim 32, wherein said first filter and said second filter are composed of a ceramic material selected from cordierite, silicon carbide, mullite, and aluminum titanate.

37. The system of claim 32, wherein said wall segments further defining at least one of said first, second, or third set of flow channels comprise a coating material.

38. The system of claim 37, wherein said coating material comprises a catalytic agent for a reaction wherein nitric oxide is oxidized to nitrogen dioxide.

39. The system of claim 32, wherein the wall segments defining said third set of flow channels have an average thickness greater than an average thickness of said wall segments defining said first set of flow channels or said wall segments defining said second set of flow channels.

40. The system of claim 32, wherein said first filter is composed of a first filtration material and said second filter is composed of a second filtration material that is different than said first filtration material.

41. The system of claim 40, wherein said first filtration material has a larger pore diameter than said second filtration material.

42. The system of claim 32, wherein said first filter has a cell density of greater than 300 per square inch and comprises flow through channels.

43. The system of claim 32, wherein said second filter has a cell density of greater than 200 per square inch.

44. The system of claim 32, wherein said first filter has a soot filtration efficiency of at least about 50% and said second filter has a soot filtration efficiency of at least about 90%.

45. The system of claim 44, wherein said first filter has a soot filtration efficiency of about 50-60%.

46. The system of claim 32, further comprising a diesel oxidation catalyst element arranged in series with said first filter and said second filter along said axial direction, said diesel oxidation catalyst element being positioned upstream of said first filter and comprising a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

47. The system of claim 46, wherein said first filter comprises a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

48. The system of claim 46, wherein said second filter comprises a catalytic agent for at least one reaction selected from the group consisting of $2CO+O_2 \rightarrow 2CO_2$; $2NO+O_2 \rightarrow 2NO_2$; and $4C_xH_y+(4x+y)O_2 \rightarrow (4x)CO_2+(2y)H_2O$, where x is an integer selected from 1-25 and y is an integer selected from 0-52.

* * * * *